(12) United States Patent
Rydin et al.

(10) Patent No.: US 6,695,590 B1
(45) Date of Patent: Feb. 24, 2004

(54) LUBRICANT PUMP HAVING PISTON WITH RADIAL THROUGH OPENING

(75) Inventors: Per Uno Magnus Rydin, Amsterdam (NL); Pär Piof Funck, Linköping (SE); Niklas Rehn, Atvidaberg (SE); Hans Erik Alveling, Atvidaberg (SE)

(73) Assignee: SKF Engineering & Research Centre B.V., Nieuwegein (NL)

( * ) Notice: Subject to any disclaimer, the term of this patent is extended or adjusted under 35 U.S.C. 154(b) by 41 days.

(21) Appl. No.: 10/110,739

(22) PCT Filed: Nov. 1, 2000

(86) PCT No.: PCT/NL00/00790

§ 371 (c)(1),
(2), (4) Date: Apr. 19, 2002

(87) PCT Pub. No.: WO01/33133

PCT Pub. Date: May 10, 2001

(30) Foreign Application Priority Data

Nov. 1, 1999 (NL) .............................................. 1013446

(51) Int. Cl.[7] .................................................. F04B 49/00
(52) U.S. Cl. ...................... 417/63; 417/415; 184/105.2; 222/262
(58) Field of Search ............................ 417/63, 41, 213, 417/214, 281, 415, 417; 184/7.4, 55.1, 105.2; 222/262

(56) References Cited

U.S. PATENT DOCUMENTS

| 2,908,898 | A |   | 10/1959 | Mueller et al. ............. 340/529 |
| 3,394,657 | A | * | 7/1968 | Sanders et al. ............. 417/417 |
| 4,076,173 | A | * | 2/1978 | Taccon et al. ............. 239/411 |
| 4,286,691 | A |   | 9/1981 | Stong .......................... 184/7.3 |
| 6,276,492 | B1 | * | 8/2001 | Carroll ....................... 184/55.1 |
| 6,354,816 | B1 | * | 3/2002 | Yang ........................... 417/411 |
| 6,405,810 | B1 | * | 6/2002 | Grach et al. .................. 175/52 |

FOREIGN PATENT DOCUMENTS

| GB | 943903 | 12/1963 |
| GB | 1 310 946 | 3/1973 |

* cited by examiner

Primary Examiner—Justine R. Yu
Assistant Examiner—Michael K. Gray
(74) Attorney, Agent, or Firm—Oliff & Berridge, PLC

(57) ABSTRACT

A lubricant pump having a housing equipped with outlets and a lubricant chamber, and having a piston axially displaceable in an axial cylinder bore in the housing by means of an electrical drive arrangement. The piston is at a first end and has an axial outlet. A first portion of the axial outlet is connected to a through-opening arranged radially on the piston position and adapted in a predetermined piston position to connect the axial outlet to a predetermined outlet of the outlets. A second portion of the axial outlet of the piston is connected to the lubricant chamber by way of an inlet and a non-return valve to allow the bore to be filled with lubricant. The outlets are arranged essentially in succession to one another. The position sensor is adapted to signal the position of the piston in the event the piston stops.

10 Claims, 5 Drawing Sheets

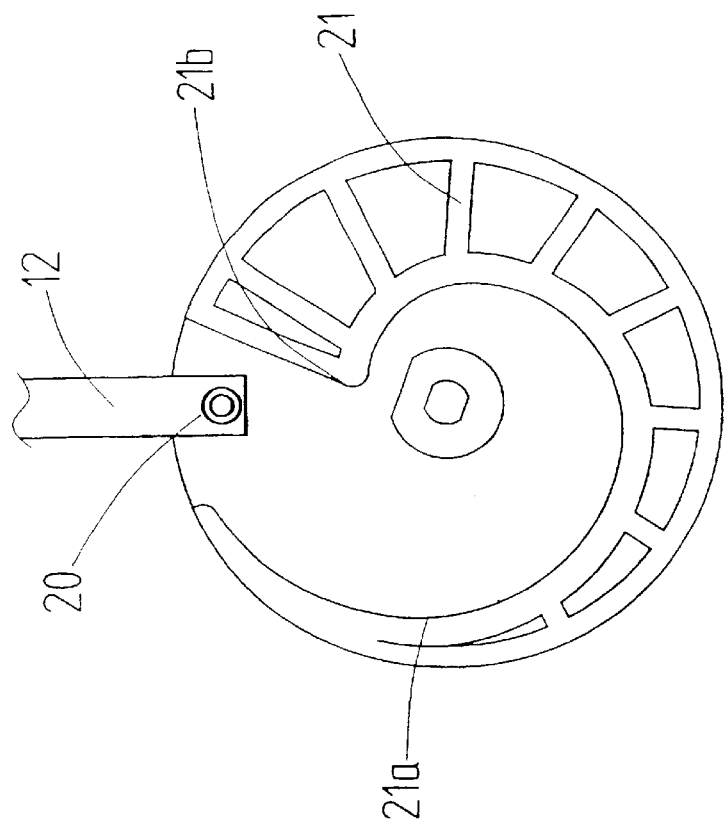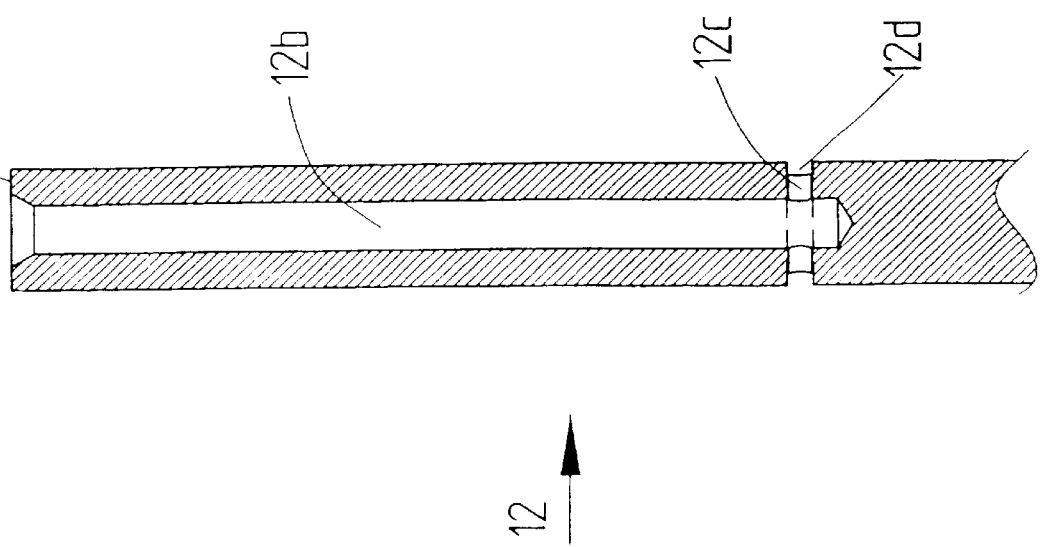

LUBRICANT PUMP HAVING PISTON WITH RADIAL THROUGH OPENING

The present invention relates to an arrangement in a lubricant pump.

Connecting a lubricant pump to a plurality of lubrication points by way of ducts or pipes so that lubricant, for example grease or oil, can be pumped out to a plurality of different lubrication points from the same pump, is already known.

Obstructions can occur in the ducts and pipes so that the lubricant cannot be pumped out. Such obstructions take the form, for example, of a blocked nozzle, dirt in the hose or quite simply a crushed pipe. Such obstructions result in poor operating conditions for the pump, but above all for the appliance or device to which the pipe with the obstruction leads, since the appliance receives a poor supply or no supply of lubricant. Poor lubrication is often discovered late and when it is discovered damage has often already occurred, involving expensive repairs and costly down time. In cases of poor lubrication where there are many pipes connected it is difficult to identify which of the lubrication points is receiving the poor lubrication. This results in additional locating work that is difficult and time-consuming.

It is an object of the present invention to produce an arrangement that eliminates or at least reduces the problems described above.

BRIEF DESCRIPTION OF THE DRAWINGS

The invention will be explained in more detail with the aid of the drawings attached, which illustrate examples of embodiments of the arrangement according to the present invention.

FIG. 2 shows an example of a piston;

FIG. 3 shows an example of an eccentric wheel;

DETAILED DESCRIPTION OF PREFERRED EMBODIMENTS

Figure 1:
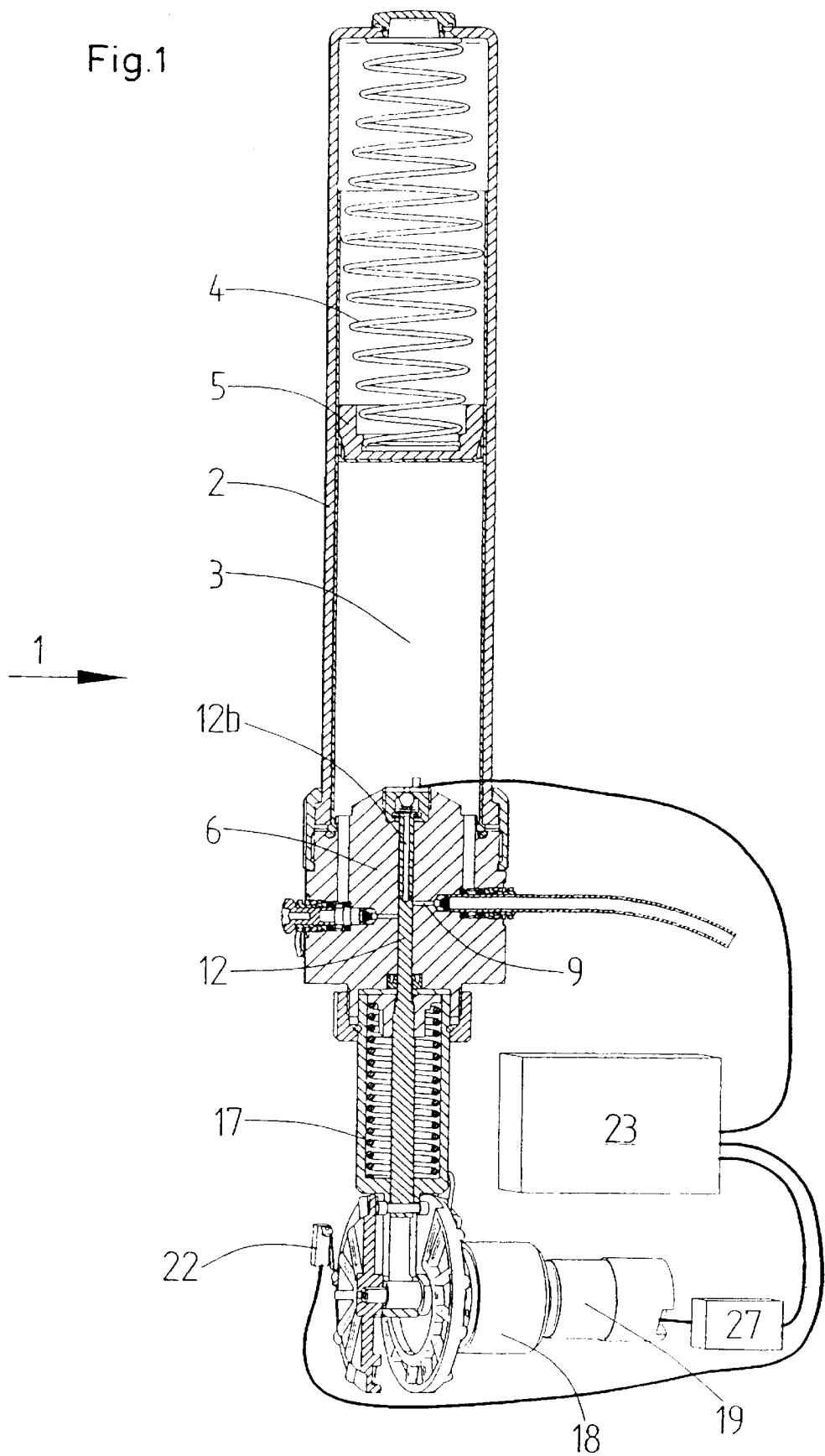
FIG. 1 in a partially cut-away diagram shows an example of a lubricant pump.
Figure 4:
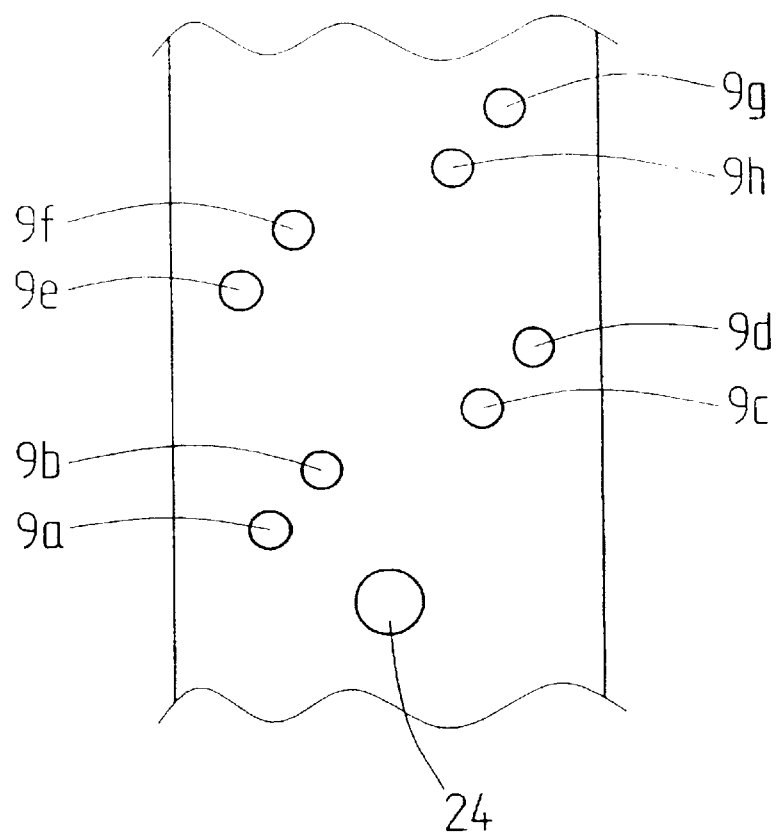
FIG. 4 shows the extent of an outer casing covering 360 degrees of a cylinder bore.

In FIG. 1, 1 generally denotes a lubricant pump with a chamber 2 for a lubricant 3. The chamber 2 is adapted to receive standard capsules containing lubricant. A compression spring 4 is located at the first end of the chamber 2, adapted to exert pressure on the lubricant by way of a plunger 5, thereby pressurising the lubricant 3 in the chamber 2. A pump housing 6 is connected to the second end of the chamber 2 and incorporates an inlet 7 with a non-return valve 8, a plurality of outlets 9 each with a non-return valve 10, an axial cylindrical bore 11 and a piston 12. The inlet 7 is located between the lubricant chamber 2 and the piston 12. The outlets 9 lead from the cylindrical bore 11 and leads radially out of the pump housing 6. The non-return valve 8 is arranged connected to the inlet 7 and is adapted to allow lubricant 3 to be delivered from the chamber 2 to the bore 11, but not in the opposite direction. The non-return valves 10 are similary arranged at each outlet 9, but in contrast to the non-return valve 8 and the inlet 7, the non-return valves at the outlets only allow lubricant to be delivered from the bore 11. The piston 12 is adapted to perform a reciprocating movement in the bore 11, a piston movement away from the inlet 7 causing the bore 11 to fill up with lubricant 3. A piston movement in the opposite direction, that is towards the inlet 7, in conjunction with the non-return valves 10 and 8, causes lubricant 3 to be pumped out of the bore 11 to the outlet 9. At least one lubricant pipe 13 is connected to the pump housing 6 at any of the outlets 9, so that lubricant 3 can be delivered from the bore 11 by way of the outlet 9 and the lubricant pipe 13 to a lubrication point (not shown).

The piston 12, which is shown enlarged in FIG. 2, comprises a distal surface 12a, an outlet 12b, a radial through-opening 12c and a slot 12d located at the opening 12c. The outlet 12b is preferably located centrally in the piston 12 and extends from the distal surface 12a to the opening 12c. The opening 12c thereby connects the outlet 12b to the slot 12d, which surrounds the piston 12. When the piston 12 moves towards the inlet 7, lubricant 3 is thus forced out in a radial direction by way of the outlet and the opening 12c together with the slot 12d. At predetermined piston positions therefore passage is allowed from the outlet 12b via the openings 12c to a predetermined outlet 9a–9h. The predetermined positions are arranged essentially in succession to one another in the direction of movement of the piston 12, so that essentially one passage at a time is open.

When the lubricant 3 cannot leave any outlet 9 due, for example, to some obstruction in the pipe 13 or the outlet 9, the piston 12 ceases its movement towards the inlet 7 due to the fact that the pressure in the lubricant is increased in excess of the normal. The position in which the piston 12 stops is determined by the location of the slot 12d on the piston in relation to the position of the outlet in question. Operatively connected to the piston is a position sensor 22, adapted to read off the position of the piston 12 and to communicate this to a monitoring unit 23, which is in turn adapted to give warning that a lubrication point is not receiving lubricant.

Figure 5:
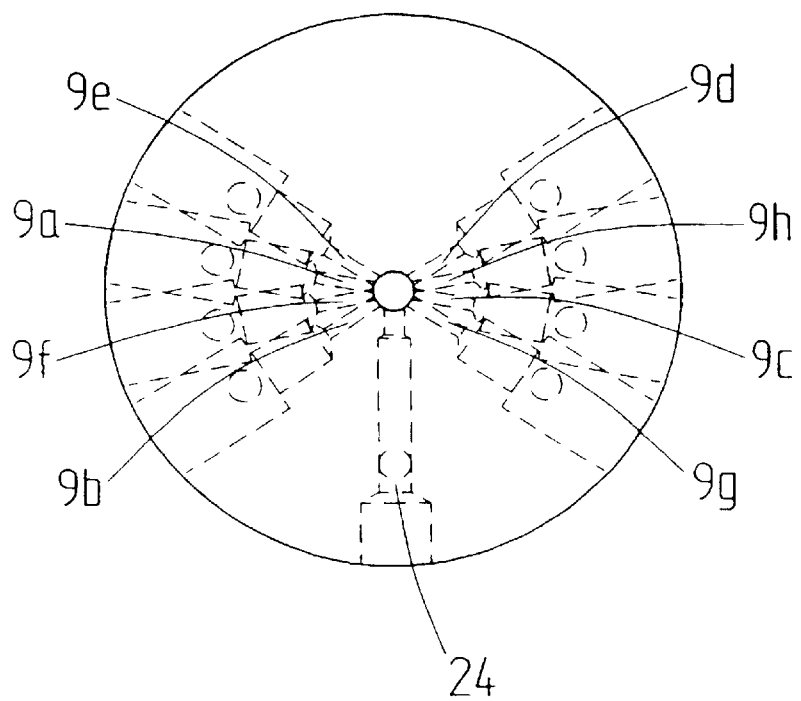
FIG. 5 shows an example of a housing with a cylinder bore and outlet.
Figure 6:
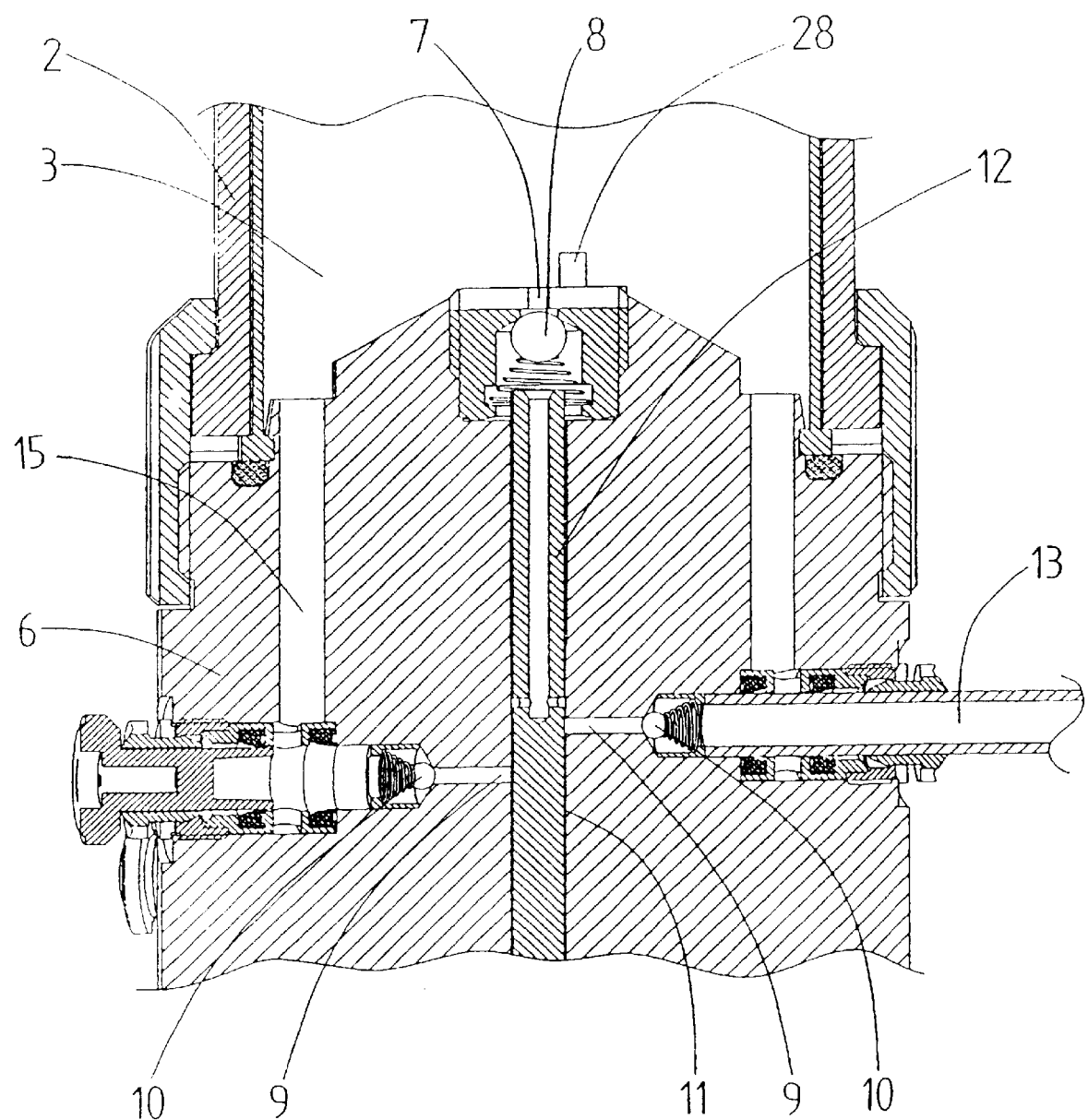
FIG. 6 shows a partial enlargement of a cut-away view of the lubricant pump in FIG. 1.
Figure 7:
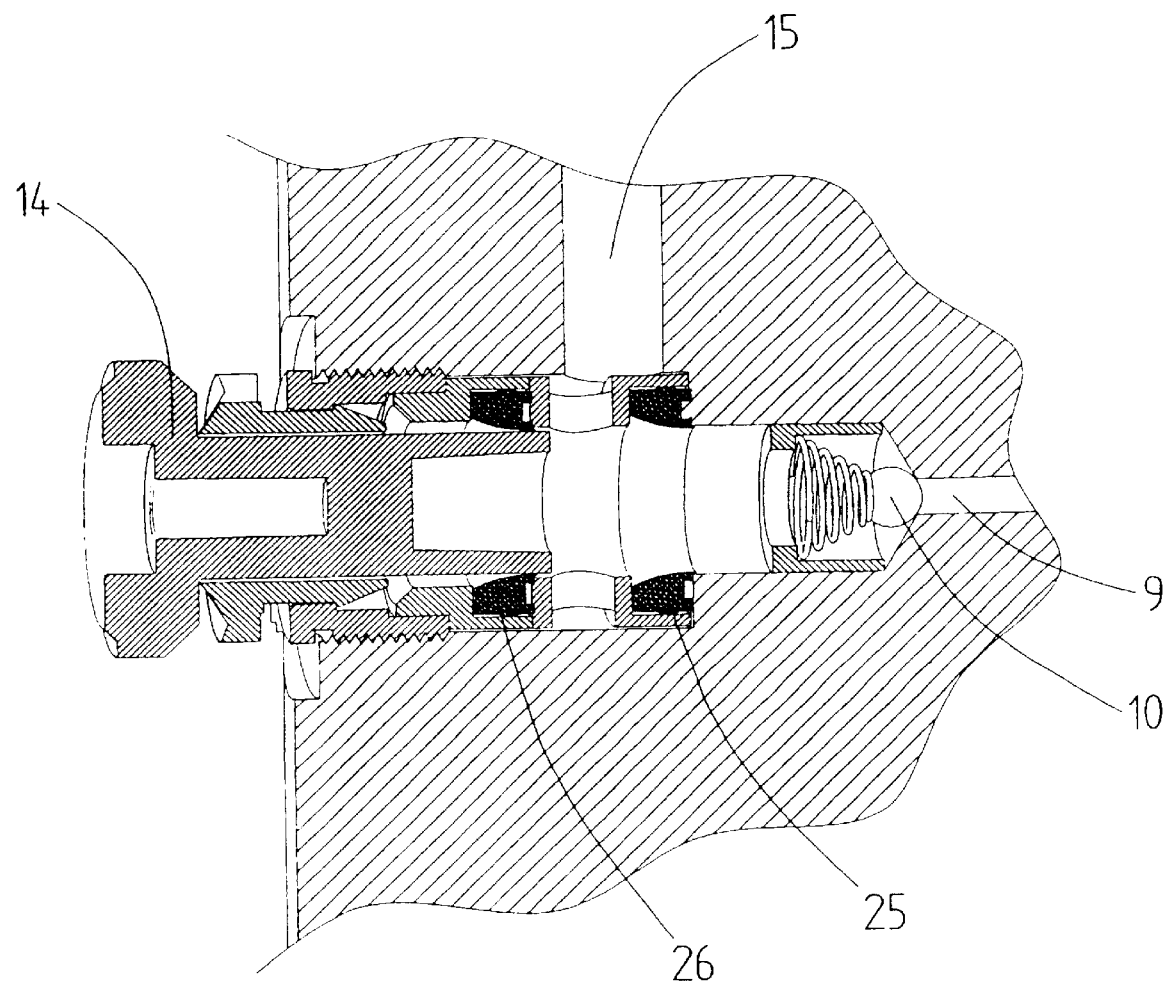
FIG. 7 in a cut-away view shows a plug in an outlet.

In the preferred embodiments, the axial distance between two successive outlets 9 is somewhat less than the axial extent of the slot 12d. The slot 12d is therefore connected to two successive outlets, for example 9a and 9b, for a short section of the piston travel. This is so that the piston 12 will not stop between two outlets 9. The distance between a first and a third outlet, for example 9a and 9c is, on the other hand, so large that the piston 12 stops when an obstruction occurs. The outlets 9 are furthermore located on parallel helices and are exemplified in FIG. 5 by two essentially opposing groups of four outlets per group. In a piston movement, lubricant is fed out into the outlets 9, from 9a to 9d in turn. This location of the outlets 9 gives a compact housing 6 and facilitates installation of the pump 1.

The quantity of lubricant 3 that is pumped through a particular outlet, for example 9b, by a piston movement is, for a given outlet diameter, proportional to the distance from the preceding outlet 9a. In order to ensure that the first outlet 9a also always receives the same quantity of lubricant 3, a blind outlet 24 is arranged ahead of the outlet 9a and is adapted to return lubricant 3 to the chamber 2. Thus minor variations in the plunger movement do not result in the first outlet 9a receiving different quantities of lubricant. The blind outlet 24 also means that too long a piston movement does not produce a piston stoppage.

At the outlets 9 there is an inner seal 25 and an outer seal 26. The inner seal 25 is adapted to seal the pipe 13 in a first instance when the outlet is delivering lubricant to a lubrication point. The outer seal 26 is adapted to seal a plug 14 in other instances when the outlet is not delivering lubricant to a lubrication point. A return duct 15 opens out between these two seals 25, 26 and connects each outlet 9 to the chamber 2. When the piston 12 moves towards the inlet 7 and the slot 12d reaches a plugged outlet 9 therefore, no significant increase in pressure occurs in the lubricant 3 in the outlet 12b and the movement of the piston 12 continues past the plugged outlet 9.

The pump is preferably driven by an electric motor 19, adapted to move the piston 12 away from the outlet 7 by means of a transmission 18 and eccentric wheel 21. The eccentric wheel 21 has two helical tracks 21a, one of which is shown in FIG. 3. The helical tracks 21a of the eccentric wheel are arranged opposite to and parallel with one another. A pin 20, connected to the piston 12 at right angles, is adapted to run in the helical tracks 21a in the direction of rotation 21c of the eccentric wheel when the latter rotates. At the terminal point 21b of the helical tracks 21a contact between the pin 20 and the helical tracks 21 ceases, a coil spring 17 returning the piston 12 and the pin 20 in a slot in the eccentric wheel 21 in the axial direction of the bore 11 towards the inlet 7.

The monitoring unit 23 is coupled to the pump 1 and is connected to the position sensor 22, a load sensor 27 and a contact 28. The position sensor 22 is arranged in working contact with the piston 12. In the preferred embodiment the sensor 22 is located at the eccentric wheel 21, since there is more space there and fewer problems with impurities. Thus the piston position is determined by way of the eccentric wheel 21 only when it is in working contact with the piston 12, in other words when the pin 20 bears against the helical tracks 21a. The load sensor 27 measures the load on the motor 19 and decides whether the pin 20 is in contact with the helical grooves 21. Should an obstruction occur in the pipe 13, the spring 17 does not return the piston 12 to its normal starting position, but stops somewhere in its travel. This means that when the eccentric wheel 21 rotates the pin 20 encounters the helical grooves 21a closer to the terminal point 21b of the helical tracks than usual. In this position the motor load increases and the load sensor 27 transmits a signal to the monitoring unit 23, which is adapted to calculate from the signals of the sensor 22 and the sensor 27 where the piston is situated and thereby to determine which outlet 9 is not functioning. The contact 28 is adapted to be depressed by the plunger 5 when the lubricant 3 in the chamber 2 is depleted.

It will be obvious that the invention can be modified in many ways within the framework of the invention. Thus in an altenative embodiment the position sensor 22 is arranged directly on the piston 12. In a further embodiment the piston 12 is connected to the drive 19 by way of a connecting rod and a crank throw, which also means that the return spring 17 is replaced.

What is claimed is:

1. A lubricant pump comprising a housing equipped with a plurality of outlets and a lubricant chamber, a piston axially displaceable in an axial cylinder bore in the housing by means of an electrical drive arrangement, the piston at a first end having an axial outlet, a first portion of the axial outlet being connected to a through-opening, arranged essentially radially on the piston and adapted, in a predetermined piston position, to connect the axial outlet to a predetermined outlet of the plurality of outlets, a second portion of the axial outlet of the piston being connected to the lubricant chamber by way of an inlet and a non-return valve to allow the bore to be filled with lubricant, the plurality of outlets being arranged essentially in succession to one another, and wherein the pump being characterized in that a position sensor is adapted to signal the position of the piston in the event of piston stoppage.

2. A pump according to claim 1, characterized in that in each of the plurality of outlets that is not being used for lubrication, there is a plug allowing return of lubricant to the lubricant chamber.

3. A pump according to claim 1, characterized by a load sensor, adapted to measure an electrical load on the electrical drive arrangement and a monitoring unit, adapted to monitor the electrical load on a basis of the position of the piston.

4. A pump according to claim 1, characterized by an eccentric wheel, operatively connected to the electrical drive arrangement and adapted, under rotation, to displace the piston axially away from the inlet in order to allow the bore to be filled with lubricant.

5. A pump according to claim 4, characterized in that the eccentric wheel has a slot in the axial direction of the bore for releasing the piston, which has a spring, adapted to return the piston in a direction of the inlet.

6. A pump according to claim 4, characterized in that the position sensor is adapted to signal the position of the piston from the position of the eccentric wheel.

7. A pump according to claim 1, characterized in that the electrical drive arrangement is formed by an electric motor.

8. A pump according to claim 1, characterized in that the plurality of outlets open out into the cylinder bore essentially along parallel helical lines.

9. A pump according to claim 1, characterized in that a blind outlet is arranged ahead of the plurality of outlets in a direction of travel of the piston towards the inlet.

10. A pump according to claim 1, characterized in that there is a slot in an outer surface of the piston situated transversely to a direction of travel of the piston and connected to the through-opening.

* * * * *